United States Patent
Libsch et al.

[11] Patent Number: 5,261,511
[45] Date of Patent: Nov. 16, 1993

[54] LIGHTWEIGHT AND HIGH THERMAL CONDUCTIVITY BRAKE ROTOR

[75] Inventors: Thomas A. Libsch, Novi; Seong K. Rhee, Northville, both of Mich.

[73] Assignee: Allied-Signal Inc., Morristown, N.J.

[21] Appl. No.: 982,110

[22] Filed: Nov. 25, 1992

Related U.S. Application Data

[63] Continuation-in-part of Ser. No. 809,719, Dec. 17, 1991, abandoned.

[51] Int. Cl.⁵ .................. F16D 65/12; F16D 11/00
[52] U.S. Cl. ...................... 188/218 XL; 188/72.4; 192/107 M
[58] Field of Search ........ 188/218 XL, 218 R, 251 R, 188/251 A, 251 M, 264 A, 264 AA; 192/107 M; 428/614

[56] References Cited

U.S. PATENT DOCUMENTS

| | | | |
|---|---|---|---|
| 3,703,224 | 11/1972 | Bray | 188/251 M |
| 3,948,364 | 4/1976 | Lowey | 192/107 M |
| 4,290,510 | 9/1981 | Warren | 188/218 X L |
| 4,311,524 | 1/1982 | Genkin et al. | 192/107 M |
| 4,438,004 | 3/1984 | Myers | 188/251 M |
| 4,565,744 | 1/1986 | Walter et al. | 428/614 |
| 4,815,572 | 3/1989 | Froberg et al. | 188/251 M |
| 4,839,238 | 6/1989 | Nakatani et al. | 428/614 |
| 5,005,676 | 4/1991 | Gassiat | 188/218 X L |
| 5,028,494 | 7/1991 | Tsujimura et al. | 428/614 |

FOREIGN PATENT DOCUMENTS

| | | | |
|---|---|---|---|
| 663012 | 5/1963 | Canada | 188/119 |
| 0360254 | 3/1990 | European Pat. Off. | 188/218 X L |
| 1052636 | 12/1966 | United Kingdom . | |

Primary Examiner—Robert J. Oberleitner
Assistant Examiner—Chris Schwartz
Attorney, Agent, or Firm—Leo H. McCormick, Jr.; Ken C. Decker

[57] ABSTRACT

A brake rotor for use with a caliper in a brake system is made from a composition having from 20–80 percent by volume of silicon carbide and from 80–20 percent by volume of an iron alloy consisting of: 0.4 to 4.0 percent by weight of total carbon; 1.8 to 18.0 percent by weight of Si; 1.0 to 10.0 percent by weight of X where X is selected from a group consisting of Cr, Mo, Mn, Ni, P and S; and the balance of iron alloy being Fe, the composition having a theoretical thermal conductivity at room temperature of 0.19 to 0.41 cal/cm*sec*deg C.

7 Claims, 2 Drawing Sheets

ROTOR 12

| MATERIAL | DENSITY (Kg/m³) x 10⁻³ | | THERMAL CONDUCTIVITY cal/cm sec°C | | THERMAL DIFFUSION (M²/sec.) x 10⁻⁶ | | HEAT CAP (J/m³-K) x 10⁻⁶ | |
|---|---|---|---|---|---|---|---|---|
| | CALC | ACTUAL | CALC | ACTUAL | CALC | ACTUAL | CALC | ACTUAL |
| CAST IRON | | 7.2 | | .11 | | 15 | | 3.0 |
| AL MMC (20 SiC) | | 2.7 | | .39 | | 63 | | 2.6 |
| COPPER ALLOY | | 8.9 | | .77 | | 95 | | 3.4 |
| A Fe-20 SiC | 6.4 | | .19 | | 28 | | 2.8 | |
| B Fe-30 SiC | 6.0 | | .22 | | 33 | | 2.8 | |
| C Fe-50 SiC | 5.2 | | .30 | | 48 | | 2.6 | |
| D Fe-70 SiC | 4.4 | 4.7 | .37 | | 65 | | 2.4 | 2.7 |
| E Fe-80 SiC | 4.0 | | .41 | | 72 | | 2.4 | |

FIG. 3

LIGHTWEIGHT AND HIGH THERMAL CONDUCTIVITY BRAKE ROTOR

This is a continuation-in-part of application Ser. No. 07/809,719, filed Dec. 17, 1991, now abandoned.

This invention relates to a brake rotor made from composites of from 20–80 percent by volume of silicon carbide and from 80–20 percent by volume of iron alloy. The silicon carbide in the composite imparts a high thermal conductivity characteristic to carry away thermal energy generated between first and second friction surfaces and brake pads located in a caliper during a brake application.

In an effort to increase the overall fuel efficiency for a vehicle, the overall weight of the vehicle has been decreasing for a period of time. One of the ways that the weight can be reduced is to replace the cast iron brake rotor with a brake rotor made from an aluminum or other light weight metal. Unfortunately, aluminum is not normally resistant to abrasion. As a result, when aluminum is used, a wear resistant surface coating of the type disclosed in U.S. Pat. No. 4,290,510 must be applied to the friction engagement surfaces. This type of protection for aluminum rotors is adequate for some applications as long as the thermal energy generated during a brake application is below 900° F. or 480° C. However, in many instances, the thermal energy generated exceeds the melting point of aluminum and as a result the rotors become soft. Therefore it is imperative to develop a rotor having the capability of conducting thermal energy from a wear surface while maintaining good mechanical properties such as hardness and strength at high temperatures during a brake application.

A rotor made from a chromium copper alloy has exhibited a thermal conductivity of approximately six times greater than cast iron and has exhibited satisfactory performance. Unfortunately, the density of such chromium copper rotors is also more than corresponding cast iron rotors and as a result an increase in the overall weight of a vehicle would not improve the fuel efficiency as desired.

After evaluating many compositions, silicon carbide-copper alloy composites as disclosed in copending U.S. patent application Ser. No. 894,876 filed Jun. 8, 1992, were developed for use as a brake rotor. Such silicon carbide-copper alloy composite rotors, which have a thermal conductivity about one and one-half times cast iron and a relative density approximately two-thirds of cast iron, would perform in an adequate manner for most brake applications.

Since cost of materials is an important consideration in the manufacture of a brake rotor, we have discovered that an iron alloy/silicon carbide metal matrix composite also has a higher thermal conductivity and greater overall strength at higher temperatures than gray cast iron with an overall weight reduction that exceeds silicon carbide-copper alloy composites. We have now developed a metal alloy metal matrix composite with a composition being selected from 20–80 percent by volume of silicon carbide and from 80–20 percent by volume of iron alloy. Silicon carbide powder is packed in a mold and iron alloy is infiltrated into the packed volume of silicon carbide to form a unitary brake rotor. The brake rotor has a hub with a plurality of openings therein for attachment to an axle of a vehicle which rotates with a wheel and spokes or a solid disc which radially extends from the hub to an annular head portion. The head portion has first and second friction surfaces thereon for engagement with brake pads during a brake actuation. The brake rotor has a density of 4.0 to 6.4 g/cm$^3$ and a resultant thermal conductivity in the range of 0.19 cal/cm* sec*deg C. (79 W/m*k)–0.41 cal/cm·sec·°C. (171 W/m*K).

It is an object of this invention to provide compositions of silicon carbide and iron alloy for use in a brake rotor.

It is a further object of this invention to provide high thermal conductivity and relative light weight compositions for use in a brake rotor to withstand the generation of thermal energy during a brake application without degradation.

It is a still further object of this invention to provide a composite for use in a brake rotor having a silicon carbide and iron alloy composition with a density of approximately seventy percent of cast iron but with a greater thermal conductivity to maintain the effectiveness of a brake system over a wider range of operation.

These objects and advantages should be apparent from reading this application while viewing the drawings wherein:

FIG. 3 is a table illustrating physical and thermal characteristics of various composites for the rotor of FIG. 1.

Figure 1:
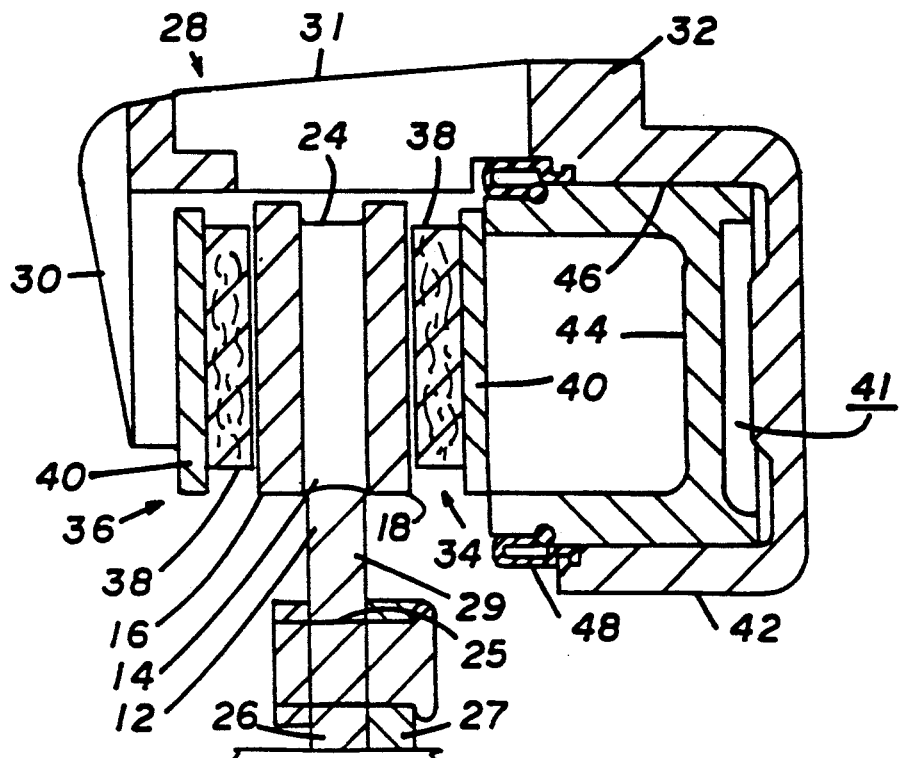
FIG. 1 is a schematic illustration of a brake system wherein a rotor made according to this invention is located between friction pads carried by a caliper.
Figure 2:
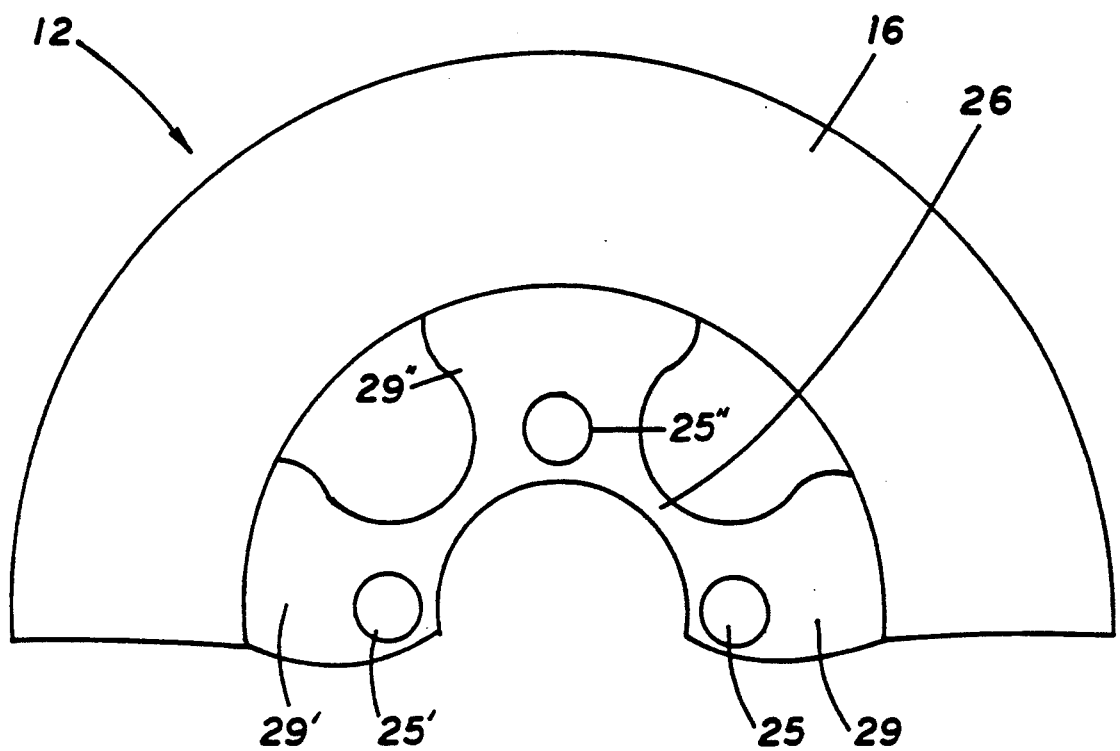
FIG. 2 is a side view of the rotor of FIG. 1.

In the brake system shown in FIG. 1 for a wheel of a vehicle, a caliper 28 retains brake pads 34 and 36 for engagement with a rotor 12 made from an alloy selected from a composition shown in FIG. 3.

Rotor 12 has a hub 26 with a plurality of openings 25, 25' ... 25$^n$ located therein for attachment to an axle 27 of a vehicle. The rotor 12 rotates with a wheel and may have spokes 29, 29' ... 29$^n$ which radially extending from the said hub 26 to the annular head portion 14 or a solid central disc that connects the hub 26 with the annular head portion 14. However, the spokes 29, 29' ... 29$^n$ may be preferred due to a greater potential to dissipate heat into the surrounding environment. The head portion 14 has a pair of friction faces 16 and 18 formed thereon which are connected together by a plurality of webs 24 having radially extending spaced therebetween. The webs 24 hold the engaging faces 16 and 18 parallel while the spaces therebetween allow the flow of cooling air between the webs 24 to promote cooling of the rotor 12. In addition the space between the spokes 29, 29' ... 29$^n$ allows a certain amount of air flow to also cool the rotor 12.

A caliper 28 is located on the vehicle and has a pair of legs 30 and 32 which are located in a spaced parallel relationship with faces 16 and 18 on rotor 12. Brake pads 34 and 36 which include a friction lining 38 and a backing plate 40, are positioned on caliper 28 to axially move in a direction generally perpendicular to the planar rotation of the rotor 12 in response to hydraulic fluid being supplied to chamber 41 of fluid motor 42.

The fluid motor 42 is carried by leg 32 of caliper 28 and includes a piston 44 located in cylinder bore 46. A flexible boot or seal 48 has one end fixed to the caliper and the other end fixed to piston 44 to seal chamber 41 and prevent dirt, water and other contaminants from entering bore 46.

During a brake application, hydraulic fluid is supplied to chamber 41 to move piston 44 and brake pad 34 toward face 18 on rotor 12 while at the same time leg 32 acts through web 31 and leg 30 to pull brake pad 36 toward face 16 on rotor 12. As the friction material 38 of brake pads 34 and 36 engage friction faces 16 and 18 thermal energy is generated. At temperatures below 400° F. or 205° C. the wear rate of the friction material is primarily controlled by the selection of friction modifiers in the friction material while at temperatures above 400° F. or 205° C. the wear rate increases exponentially with increasing temperature due to thermal degradation of the binder in the friction material. Thus, it is important that thermal energy generated during braking be conducted away from the friction material as quickly as possible.

Various iron alloy materials from which rotors 12 may be manufactured and their particular characteristics are identified in FIG. 3.

From experimentation it has been determined that a typical rotor 12 made from gray cast iron weighs about 12 pounds or approximately 5.5 Kg. As shown in FIG. 3 a rotor of this type at room temperature 20° C. (68° F.) could be expected to conduct 0.11 cal/cm (46 W/mK) of thermal energy away from the friction pads 34 and 36 at a rate of 15 $M^2/sec \times 10^{-6}$. As long as the temperature generated during a brake application is below 1600° F. or 870° C. this type of rotor performs in a satisfactory manner.

In order to reduce the overall weight of a vehicle, it has been suggested to replace the cast iron in a rotor with an aluminum metal matrix composite which includes 20 volume percent of silicon carbide. A rotor 12 made from this composition would have a weight of approximately 4.6 pounds or 2.1 Kg. Thus it is easy to demonstrate that the use of an aluminum alloy composition provides a considerable reduction in weight for a rotor. In addition, theoretically the conductivity of thermal energy of such a rotor would increase about three and one-half times resulting in an approximate five fold rate of diffusion away from the friction material when compared to a gray cast iron rotor based on data presented in FIG. 3. As long as the thermal energy generated during a brake application is below 900° F. or 480° C., a rotor made from this type aluminum composition performs in a satisfactory manner. Unfortunately in meeting the current standard for braking established by the United States Department of Transportation, the thermal energy generated most likely will exceed 900° F. or 480° C. which will result in a degradation of the brake lining and braking surfaces on aluminum composite rotors. Thus, a need exists to increase the thermal capability of the brake rotor.

A brake rotor 12 was made from a chromium copper alloy as disclosed in U.S. patent application Ser. No. 894,876. Theoretically, a rotor made from such a chromium copper alloy has approximately a six times rate of thermal conductivity and rate of diffusion as compared to a similar cast iron rotor based on data presented in FIG. 3. Unfortunately the weight of such a rotor would increase to approximately 15.2 pounds or 6.9 Kg and as a result there would be increase in the overall weight of a vehicle. However, the improvement in the thermal characteristics of the chromium copper alloy was used as a basis in the development of an iron alloy material for use as a brake rotor in the present invention.

As used in this specification the term iron alloy shall mean a material which possesses the following ingredients:

| Ranges | Actual |
| --- | --- |
| TC: 0.4 to 4.0% by weight | (3.38); |
| Si: 1.8 to 18.0% by weight | (2.05); |
| X: 1.0 to 10.0% by weight | (1.51); and |
| Fe: Balance of mixture | (93.06) |
| | Total 100.00 | where TC means total carbon; X is an alloying modifier selected from a group consisting of Cr (0.13), Mo (0.08), Cu (0.28), Mn (0.75), Ni (0.13), P (0.06) and S (0.08).

Iron alloy was substituted for the chromium copper alloy because of the high strength which the iron alloy possesses at temperatures over 1560° F. or 850° C., a lower density and a lower material cost. The following specific compositions identified in FIG. 3 as A, B, C, D and E were developed to evaluate a range of the use for the iron alloy in a brake rotor.

A brake rotor 12 made from composition A having about 20% by volume of silicon carbide and 80% by volume of iron alloy would have a weight of approximately 10.8 pounds or 4.9 Kg which is about 11% less than a gray cast iron rotor. A rotor 12 made from composition A also has a theoretical or calculated improvement in both the conductivity and rate of thermal diffusion as shown in FIG. 3.

A brake rotor 12 made from composition B having about 30% by volume of silicon carbide and 70% by volume of iron alloy would have a weight of approximately 10.0 pounds or 4.6 Kg which is about 17% less than a gray cast iron rotor. A rotor 12 made from composition B also has a theoretical or calculated improvement in both conductivity and rate of thermal diffusion as shown in FIG. 3.

A brake rotor 12 made from composition C having about 50% by volume of silicon carbide and 50% by volume of iron alloy would have a weight of approximately 8.6 pounds or 3.9 Kg which is about 28% less than a gray cast iron rotor. A rotor 12 made from composition C also has a theoretical or calculated improvement in both conductivity and rate of thermal diffusion as shown in FIG. 3.

A brake rotor 12 made from composition D having about 70% by volume of silicon carbide and 30% by volume of iron alloy would have a weight of approximately 7.3 pounds or 3.3 Kg which is about 39% less than a gray cast iron rotor. A rotor 12 made from composition D also has a theoretical or calculated improvement in both conductivity and rate of thermal diffusion as shown in FIG. 3 when manufactured, the actual density and heat capacity of composition D exceeded the calculated characteristics of composition D.

A brake rotor 12 made from composition E having about 80% by volume of silicon carbide and 20% by volume of iron alloy would have a weight of approximately 6.7 pounds or 3.1 Kg which is about 44% less than a gray cast iron rotor. A rotor 12 made from composition E also has a theoretical or calculated improvement in both conductivity and rate of thermal diffusion as shown in FIG. 3.

During the manufacture of a rotor 12 from composition A, B, C, D or E, silicon carbide powder located in a mold would be infiltrated by molten iron alloy at approximately 2190°–2730° F. or 1200°–1500° C. This temperature which is below the melting point of silicon carbide is sufficient to cause the iron alloy to flow and create an interconnected matrix for a resulting rotor 12.

What is claimed is:

1. A rotor for use with a caliper braking means comprising:
   a hub having a plurality of openings therein for attachment to an axle of a vehicle to rotate with a wheel;
   an annular disc radially extending from said hub; and
   an annular head portion attached to said annular disc, said head portion having first and second friction surfaces thereon for engagement with brake pads on actuation of said caliper to effect a brake application, said rotor being made from a composition having from 20-80 percent by volume of silicon carbide and 80-20 percent by volume of iron alloy consisting of: 0.4 to 4.0 percent by weight of total carbon; 1.8 to 18.0 percent by weight of Si; 1.0 to 10.0 percent by weight of X where X is selected from a group consisting of Cr, Mo, Cu, Mn, Ni, P and S; and the balance of iron alloy being Fe, said composition a density of 4.0 to $6.4 \times 10^{-3}$ (Kg/m$^3$) and at room temperature having a thermal conductivity 0.19 to 0.41 cal/cm·sec·°C., said iron alloy effectively dissipating thermal energy created on engagement of said first and second friction surfaces with brake pads to attenuate the degradation of said rotor when the level of said thermal energy is above 482° C.

2. The rotor as recited in claim 1 wherein said iron alloy forms a matrix for uniformly conducting thermal energy away from said first and second friction surfaces on engagement with said brake pads.

3. The rotor as recited in claim 2 wherein said thermal energy from said head is communicated into said annular disc for dissipation into the surrounding environment.

4. A rotor for use with a caliper braking means comprising:
   a hub having a plurality of openings therein for attachment to an axle of a vehicle, said hub rotating with a wheel on said vehicle;
   spokes radially extending from said hub; and
   an annular head portion attached to said spokes, said head portion having first and second friction surfaces thereon for engagement with brake pads on actuation of said caliper to effect a brake application, said rotor being made from a composition having from 20-80 percent by volume of silicon carbide and 80-20 percent by volume of an iron alloy consisting of: 0.4 to 4.0 percent by weight of total carbon; 1.8 to 18.0 percent by weight of Si; 1.0 to 10.0 percent by weight of X where X is selected from a group consisting of Cr, Mo, Cu, Mn, Ni, P and S; and the balance of iron alloy being Fe, said composition having a theoretical thermal conductivity at room temperature 0.19 to 0.41 cal/cm·sec·°C., said iron alloy effectively dissipating thermal energy generated by the engagement of said first and second friction surfaces with said brakes pads during a brake application to attenuate degradation to said rotor when the level of the thermal energy is above 482° C.

5. The rotor as recited in claim 4 wherein said composition comprises 70 percent by volume of silicon carbide and 30 volume percent of iron alloy to produce a theoretical density of 4.4 g/cm$^3$.

6. The rotor as recited in claim 5 wherein said iron alloy forms a matrix for uniformly conducting thermal energy away from said first and second friction surfaces on engagement with said brake pads.

7. The rotor as recited in claim 6 wherein said composition comprises 80 percent by volume of silicon carbide and 20 volume percent of iron alloy to produce a theoretical density of 4.0 g/cm$^3$.

* * * * *